Feb. 21, 1967 K. H. CASSON 3,305,094
VACUUM FILTER
Filed July 8, 1964 6 Sheets-Sheet 1

INVENTOR
Kenneth H. Casson
by Wolfe, Hubbard, Voit & Osann
ATTORNEYS

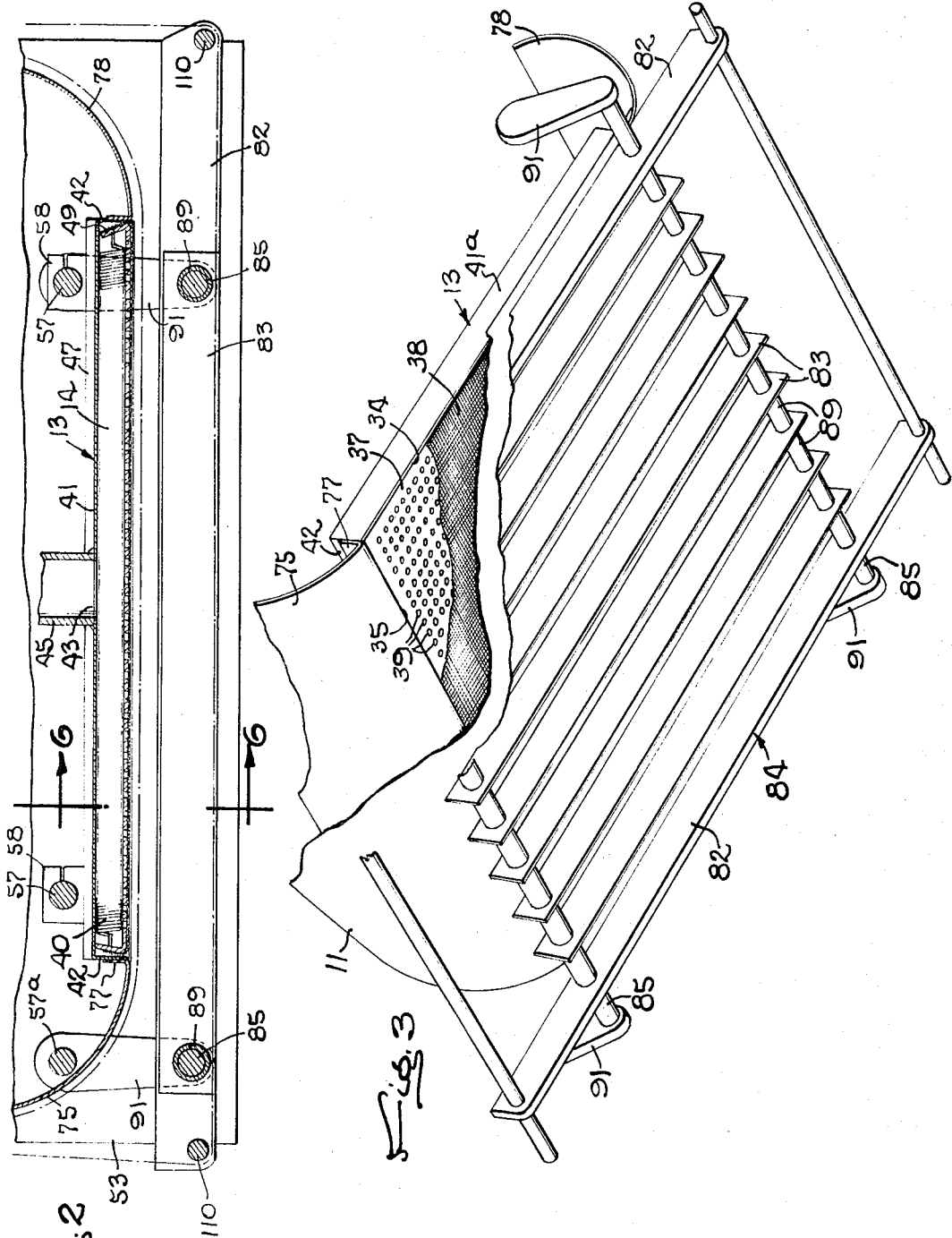

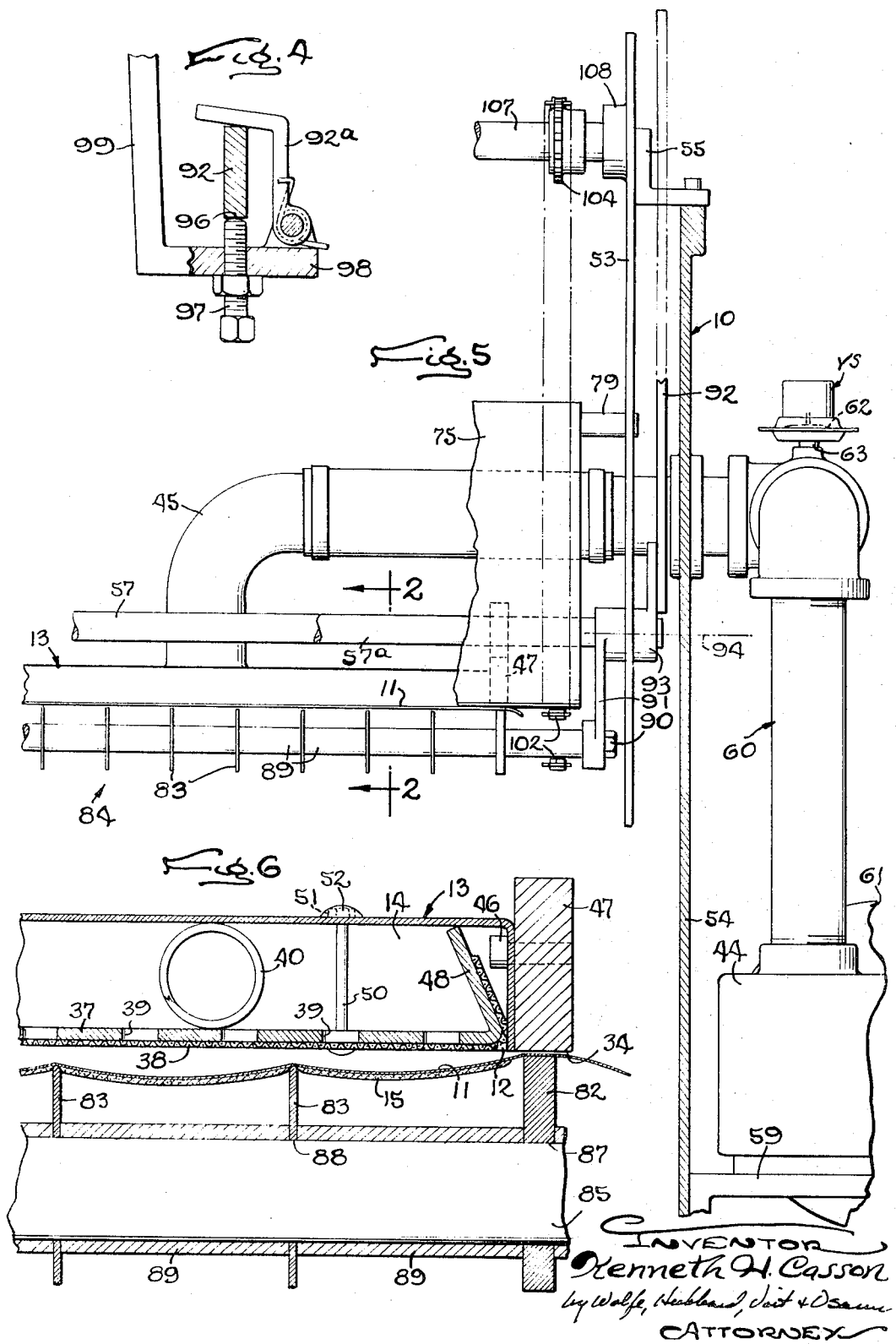

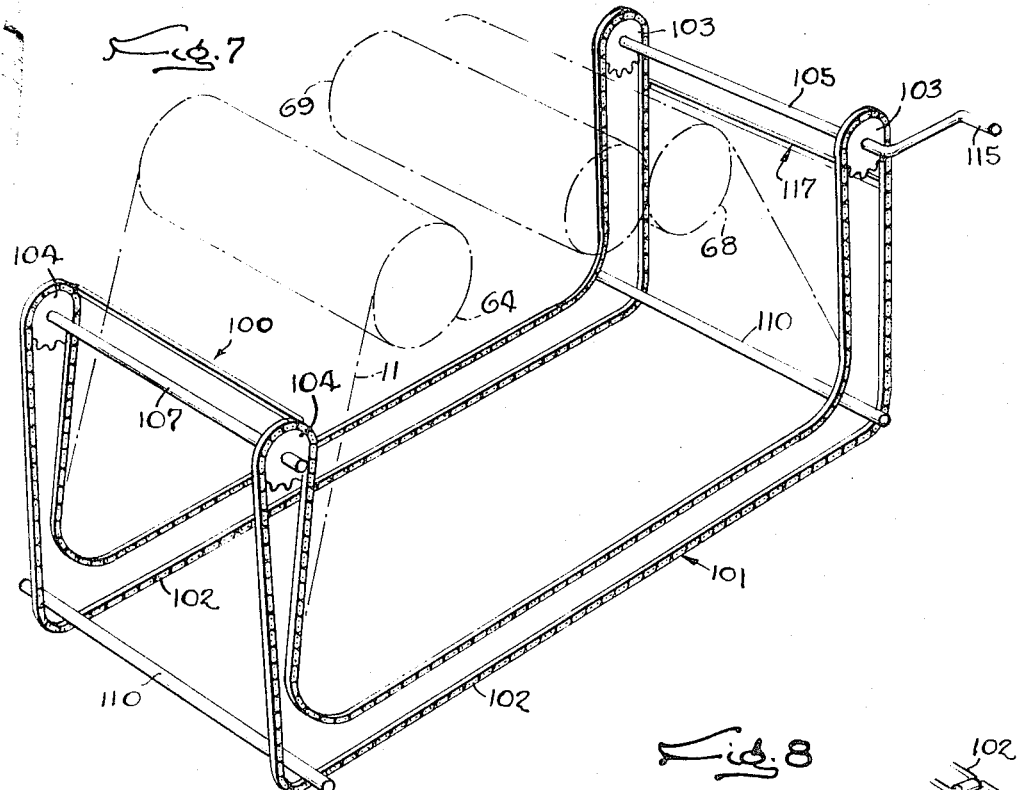
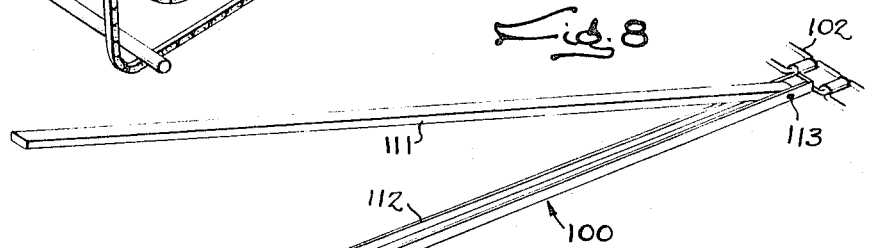
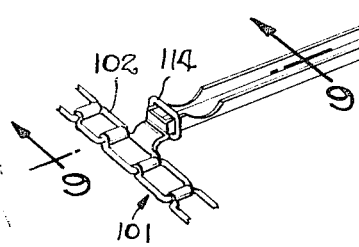
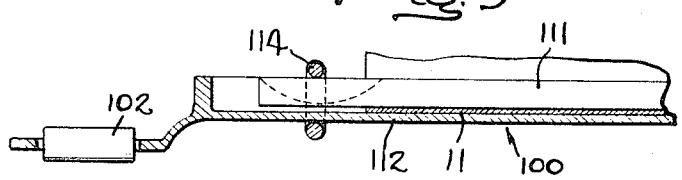

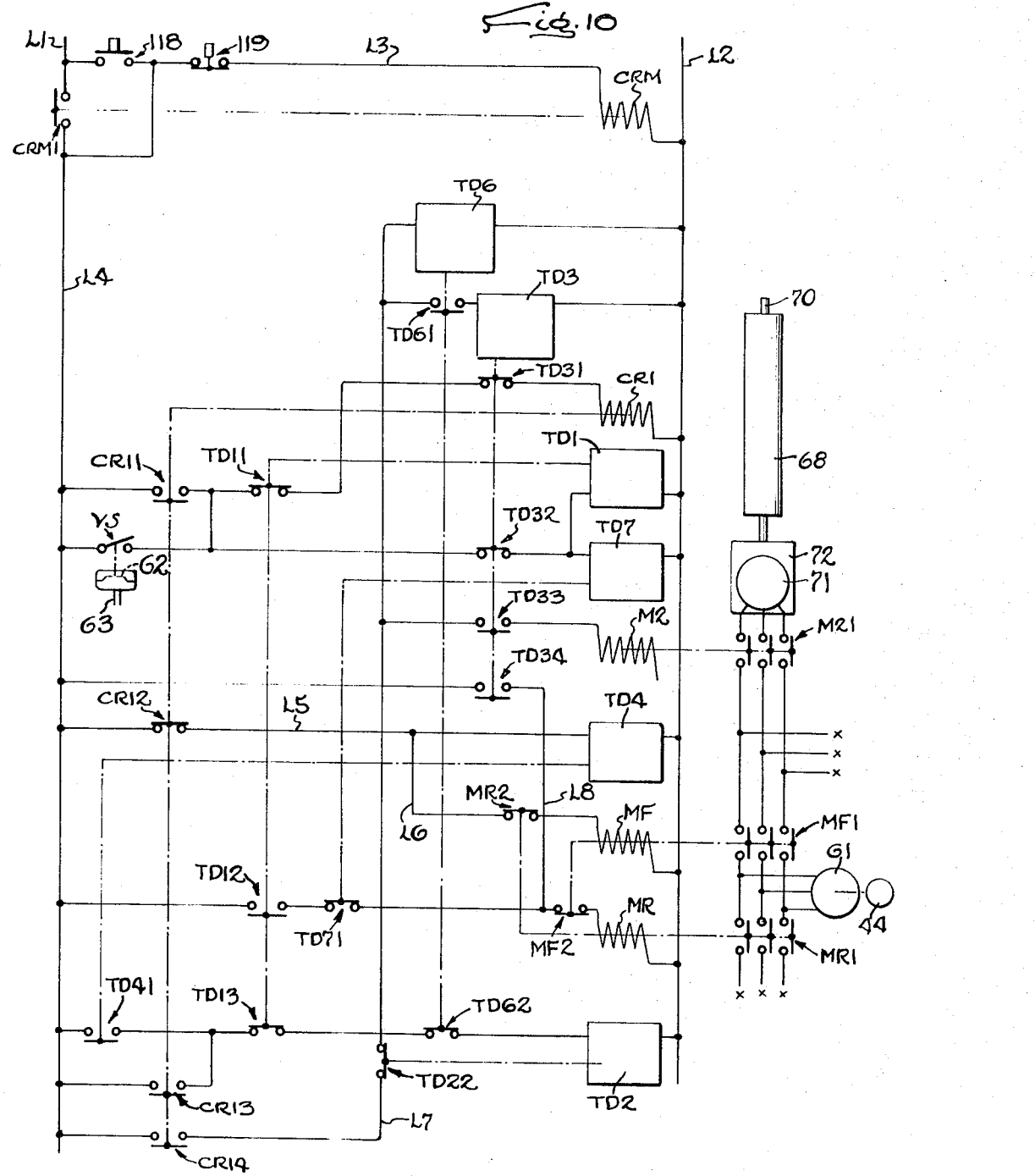

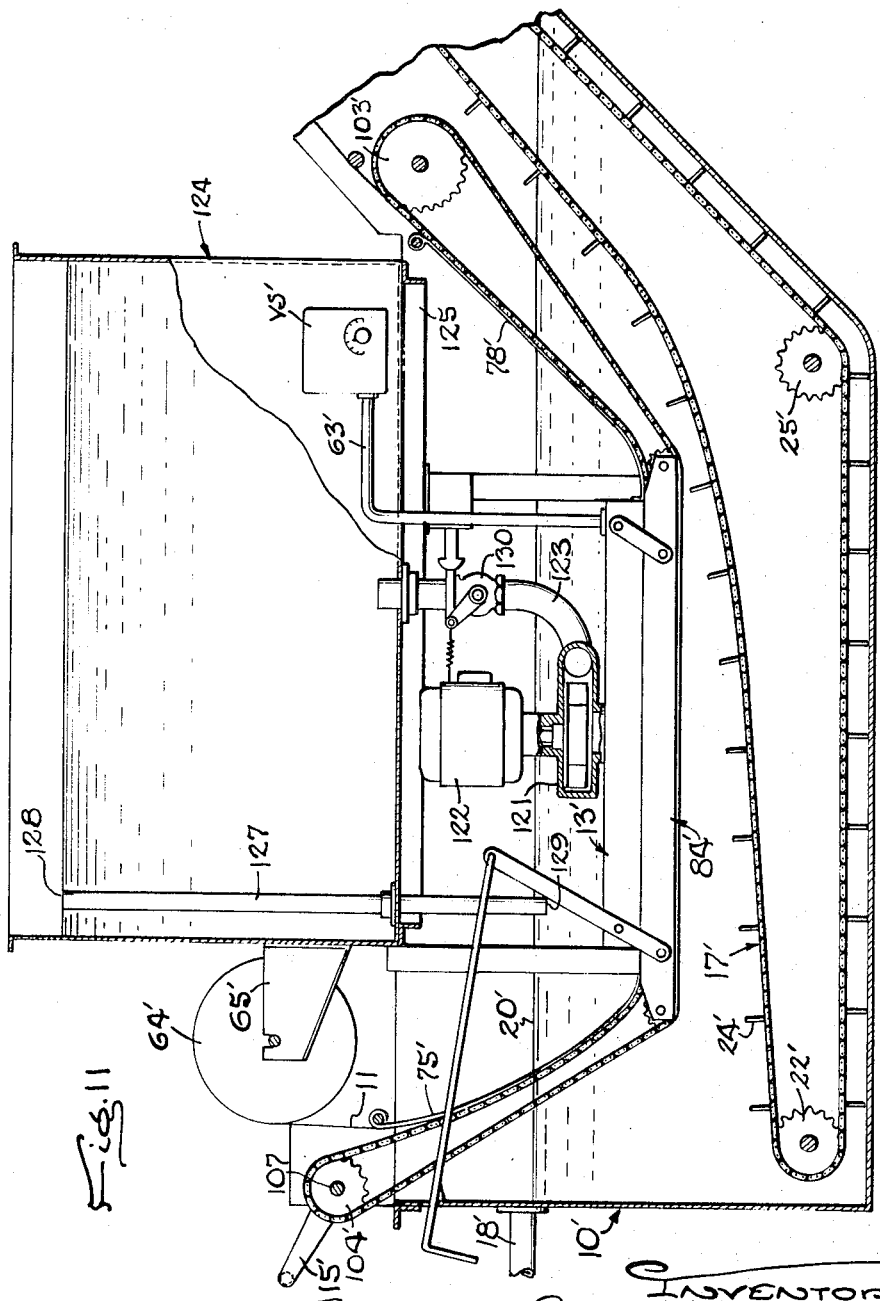

United States Patent Office 3,305,094
Patented Feb. 21, 1967

3,305,094
VACCUM FILTER
Kenneth H. Casson, Winnebago, Ill., assignor to Barnes Drill Co., Rockford, Ill., a corporation of Illinois
Filed July 8, 1964, Ser. No. 381,113
18 Claims. (Cl. 210—108)

This invention relates to liquid filters of the type in which an active portion of an elongated indexible filter web extends downwardly into a body of dirty liquid in a tank and across an opening in the submerged underside of a hollow member defining a vacuum chamber, and is backed by a screen which covers the opening and prevents drawing of the web into the opening as liquid is strained through the web and pumped out of the chamber. In such filters, the filtering action preferably is interrupted periodically and the flow through the web reversed to loosen and release the cake of filtered-out solids that collects on the web. When the pores of the active portion of the filter web become so clogged in service use as to substantially impair the flow rate, the filtering action again is interrupted and the web is advanced endwise to bring a fresh length thereof into the filtering position.

The primary object of the present invention is to reduce the complexity and cost of an indexible filter of the above character by eliminating the movable backing heretofore believed to be necessary for indexing tearable filter webs.

A more detailed object is to form the vacuum chamber in a simple box-like closure with the backing screen stationarily mounted thereon and the active portion of the filter web in intimate contact with the screen during filtering, and to index the web in a novel manner across the screen without danger of tearing even the very fine and relatively delicate web material uesd for a high degree of filtering efficiency.

Another object is to prevent leakage between and contamination of the seal areas of the web and the closure even when the vacuum in the chamber has been dissipated.

A further object is to prevent contamination of the portion of the web extending downwardly into the dirty liquid prior to positioning of this portion of the web in the filtering position.

Still another object is to facilitate the initial positioning of a new length of filter web across the underside of the vacuum chamber.

Other objects and advantages of the invention will become apparent from the following detailed description taken in connection with the accompanying drawings, in which FIGURE 1 is a fragmentary longitudinal cross-sectional view of an improved filter embodying the novel features of the present invention.

FIG. 2 is a fragmentary cross-section taken along the line 2—2 of FIG. 5.

FIG. 3 is an enlarged fragmentary perspective view taken from beneath the filter shown in FIG. 1 with parts broken away for clarity of illustration.

FIG. 4 is an enlarged fragmentary cross-section taken along the line 4—4 of FIG. 1.

FIG. 5 is an enlarged fragmentary cross-section taken along the ilne 5—5 of FIG. 1.

FIG. 6 is an enlarged fragmentary cross-sectional view taken along the line 6—6 of FIG. 2.

FIG. 7 is an enlarged schematic perspective view showing part of the mechanism of FIG. 1.

FIG. 8 is an enlarged fragmentary perspective view showing one of the web clamps of FIG. 7 in the open position.

FIG. 9 is an enlarged fragmentary view taken along the line 9—9 of FIG. 8 with the clamp closed.

FIG. 10 is a schematic view and wiring diagram.

FIG. 11 is a view similar to FIG. 1 showing an alternate form of the invention.

Figure 1:
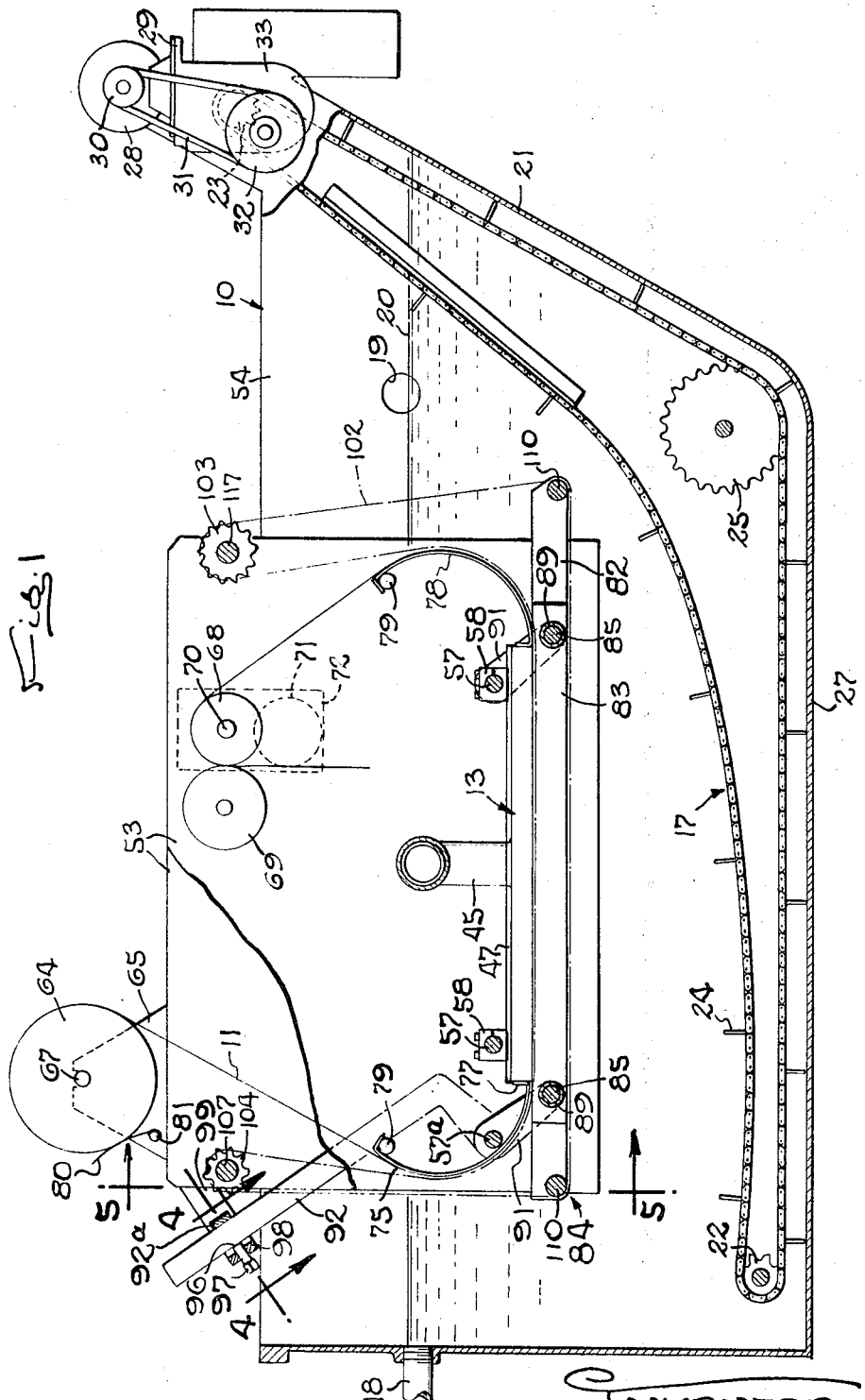

As shown in the drawings for purposes of illustration, the invention is embodied in a so-called blow-back filter comprising an open tank 10 adapted to hold a body of liquid to be filtered through an elongated strip or web 11 of a suitable porous filter medium covering a downwardly facing opening 12 (FIG. 6) in the underside of a closure 13 at least partially submerged in the liquid in the tank. The chamber 14 defined by the interior of the closure is subjected to a vacuum for inducing the straining of liquid through the web and into the chamber from which clean liquid is returned to the system for reuse. Intermittently, the vacuum in the chamber is dissipated and a positive pressure is produced therein to create a reverse flow of liquid through the active portion of the web thereby loosening and releasing the filtered out solids that have collected as a cake 15 on the underside of the web. These solids gravitate downwardly in the tank and are removed from the tank by a drag conveyor 17 while the next filtering cycle is progressing as a result of the restoration of the vacuum in the chamber shortly after the release of the cake. In this manner, one portion of the filter web may be used for a plurality of filtering cycles before it is necessary to replace the active portion of the web.

After several such cycles, however, the active portion of the web 11 becomes so clogged by solid particles trapped in the pores of the web as to impair the flow rate and substantially reduce the rate of flow through the web even immediately after the web has been cleaned by a blow-back cycle. When this condition occurs, the active portion of the web is replaced by advancing the web endwise to bring a fresh length thereof into the filtering position.

As shown in FIG. 1, the tank 10 is of box-like construction having an inlet 18 through which the liquid to be filtered may be delivered at a continuous rate equal to or greater than the average capacity of the filter. An overflow outlet 19 remote from the inlet and somewhat above the level of the bottom wall of the vacuum chamber leads to a suitable storage reservoir (not shown) and thus maintains the liquid at the desired approximate level 20.

One end wall 21 of the tank is inclined upwardly as shown in FIG. 1 to provide a track along which one run of the drag conveyor 17 extends. Herein, the conveyor comprises a pair of endless chains trained around sprockets 22 and 23 at the lower left and upper right ends of the tank and having longitudinally spaced flights 24 which project downwardly from the lower run of the chain. Idler sprockets 25 at the lower right end of the tank guide the lower runs along the tank bottom 27 and the inclined end wall 21 so that the flights pick up solids settling onto the bottom of the tank, drag the solids up the end wall of the tank, and dump the same over the right-hand end of the tank into a suitable collection receptacle (not shown). The upper sprocket 23 of the conveyor is driven either continuously or for selected intervals by a suitable motor 28 supported on a platform 29 above the right end of the tank with a pulley 30 on the motor shaft driving a V-belt 31 trained around a pulley 32 driving the sprocket 23 through suitable reduction gearing in a gear box 33.

The filter web 11 may be composed of various materials, paper composed of non-woven fibers of cotton, rayon, nylon or resin-treated cellulose being preferred. It is wide enough to cover the bottom opening 12 of the closure 13 and overlap the downwardly facing surfaces 34 and 35 (see FIG. 3) of the closure along the sides of the opening.

To support the active portion of the web 11 in the filtering position, the opening 12 is covered by a relatively rigid perforated plate 37 and a screen 38 disposed between the plate and the web to space the latter away from the imperforate areas of the plate and insure that the vacuum within the chamber 14 is applied through the perforations 39 and the screen to substantially all the pores of the web. Preferably, the perforated plate is backed by several wire coils 40 (FIGS. 2 and 6) in the vacuum chamber. During filtering, the side edge portions of the web seal against the downwardly facing surfaces 34 and 35 of the closure around the screen, and the intermediate portion of the web is drawn upwardly and held tightly against the underside of the screen. It will be evident that, as a result of the vacuum in the chamber, the active portion of the web will conform to the contour of the underside of the screen with parts of the web drawn upwardly into the pores of the screen.

In accordance with the present invention, the vacuum chamber 14 is defined by a simple box-like closure 13 with the perforated backing plate 37 and the screen 38 stationarily mounted thereon and the filter web 11 disposed immediately below and in intimate engagement with the screen during filtering. To permit changing of the active portion of the web, the latter is blown out of the pores of the screen prior to indexing and is held away from the screen during indexing thereby freeing the web for movement across the screen. At the same time, the seal areas of the web and the closure are maintained in closely spaced relation during indexing for immediate resealing upon restoration of filtering, and are continuously washed by a controlled outward flow of filtrate which prevents leakage of dirty liquid from the tank 10 into the vacuum chamber 14 and also forms thin films of liquid for maintaining the separation of the web from the sealing surfaces 34. Accordingly, the active portion of the web is changed without danger of tearing, without leakage of dirty liquid into the vacuum chamber, and without the movable backing heretofore believed to be necessary for indexing a tearable filter web.

While the closure 13 may take various forms, preferably it is simply a hollow sheet metal box having a horizontally disposed rectangular top wall 41 and relative short side and end walls 41a and 42 depending from the edges of the top wall and joined together at the four corners of the box. The downwardly facing lower edges 34 and 35 of the walls are disposed in a common plane to form a continuous downwardly facing sealing surface surrounding the opening, and all of the box walls are imperforate except for an outlet opening 43 (FIG. 2) in the top wall communicating with a pump 44 (FIG. 4) through a pipe elbow 45 joined at its lower end to the top wall around the outlet. Preferably, two rails 47 are fastened to the sidewalls of the box by screws 46 (FIG. 6) with the undersides of the rails flush with the lower edges of the box sidewalls thereby increasing the width of the side sealing surfaces 34.

The backing plate 37 is fitted into the open lower end 12 of the filter box 13 and is formed with circular perforations 39 constituting approximately one-half of the surface area of the plate. Initially, the plate is made somewhat larger than the bottom opening and its edge portions are bent upwardly to form side and end flanges 48 and 49 which project upwardly into the vacuum chamber 14 as shown in FIGS. 2 and 6. The screen 38 is placed against the underside of the perforated plate with the side and end portions of the screen disposed against the outer sides of the plate flanges, and the plate and the screen are fitted snugly into the underside of the box with the underside of the screen flush with the sealing surfaces 34 and 35. The backing unit is suitably secured in place, for example, by several bolts 50 (FIG. 6) inserted upwardly through the screen, the perforations 39, and the top wall 40 of the box and held in place by nuts 51 threaded onto the bolts above the box and sealed with solder as at 52. Then any spaces remaining between the backing unit and the box walls 41 and 42 are filled with a suitable material such as epoxy to prevent the filter web from being drawn into these spaces.

The filter box 13 is supported in the tank between two side plates 53 disposed in vertical positions adjacent the opposite sidewalls 54 of the tank (see FIG. 5) and supported on right-angle brackets 55 fastened to the outer sides of the plates and to the upper edges of the tank walls. Two horizontal rods 57 spanning and supported on the lower portions of the side plates extend through and are clamped in holes adjacent the upper ends of two pairs of posts 58 fast on and projecting above the side rails 47 thereby to mount the box on the side plates.

As shown in FIG. 5, the vacuum pump 44 is mounted on a bracket 59 on the outside of one sidewall 54 of the tank 10 with its inlet connected to the pipe elbow 45 by means of piping indicated generally at 60 and extending upwardly alongside the tank sidewall and then horizontally through the sidewall and the adjacent side plate 53 to the elbow. In the preferred form shown in FIGS. 1 through 10, the vacuum pump is of the positive displacement type such as a so-called Moyno pump manufactured by Robbins & Myers. Such a pump may be driven by a reversible electric motor 61 and is adapted to operate reversely depending upon the direction of rotation of its shaft. While running in one direction, the pump withdraws filtered liquid from the chamber 14 through the elbow and the connecting piping to create a vacuum of a magnitude determined by the prevailing condition of the filter web 11, that is, the extent of clogging of its pores and the density and thickness of the filter cake 15 which has accumulated. In the opposite direction of operation of the pump, filtrate is pumped back through the piping into the chamber to dissipate the vacuum therein and create a positive pressure resulting in backwashing of filtrate through the web.

While the filtering may be interrupted and backwashing initiated in accordance with a prearanged schedule, impairment of the filtering efficiency of the web 11 preferably is sensed by measuring the vacuum in the chamber 14. Herein, the attainment of a predetermined vacuum is sensed by a switch VS (FIGS. 5 and 10) actuated by a diaphragm 62 which is exposed on one side through a tube 63 to the pressure in the piping 60 and thus the chamber 14. When actuated, the switch VS activates the control circuits for producing the blow-back cycle of the filter.

In this instance, a supply roll 64 (FIGS. 1 and 7) of filter web is disposed above the level 20 of liquid in the tank between two plates 65 projecting upwardly from the tops of the side plates 53 above the left end of the filter box 13. A bar 67 extends through the center of the supply roll and rests adjacent its opposite ends in notches formed in the tops of the support plates thereby rotatably supporting the roll on the tank. After coming tangentially off the supply roll, the web 11 extends downwardly into the liquid in the tank, then under the filter box and along the underside of the screen 38, and finally upwardly out of the liquid at the right end of the box and between a pair of take-up rolls 68 and 69 paralleling the supply roll and rotatably mounted between the side plates in side-by-side contacting relation on shafts 70 journaled on the side plates. When one of the take-up rolls is rotated, a fresh length of filter web is pulled endwise off the supply roll and to the right under the filter box, and the used paper is pulled upwardly between the take-up rolls and fed into a disposal receptacle (not shown) on top of the filter box. Herein, an electric motor 71 (FIGS. 1 and 10) drives the roll 68 through reduction gearing in a gear box 72 connecting the motor shaft to the roll shaft.

To guide the fresh filter web 11 downwardly into the liquid and under the box 13, an imperforate metal sheet 75 the same width as the box (see FIG. 3) is mounted on the left end of the latter with its lower edge portion generally horizontal and flush with the end sealing surface 35 of the box. Herein, a lip 77 (FIG. 2) is bent upwardly at the lower end of the guide sheet and secured as by welding to the left end wall 42 of the box. From its lower end, the guide sheet curves upwardly to a point above the liquid level to present a convex guide surface facing downwardly and to the left and, in effect constituting a continuation of the left end sealing surface 35. Preferably, a similar guide sheet 78 is similarly mounted on the opposite end of the box with its lower end flush with the right end sealing surface 35 and its upper end disposed above the liquid level thereby to guide the used portion of the web upwardly out of the liquid toward the take-up rolls 68 and 69. The upper ends of the guide sheets are bent around and braced by two horizontal bars 79 (FIG. 1) spanning the side plates 53.

To insure that the filter web 11 contacts the guide sheet 75 above the level of the liquid in the tank 10 and remains in contact with the sheet all the way to the filtering position, the web comes off the roll 64 at a point spaced to the right from the upper end of the guide sheet and a light frictional drag is applied to the supply roll to hold the web taut and tightly against the guide sheet all the way to the screen 38. In this instance, the drag is produced by a plurality of resiliently flexible spring plates 80 carried by a bar 81 mounted on the plates 65 generally beneath the supply roll and pressed yieldably against the roll as shown in FIG. 1. To maintain the drag as the diameter of the supply roll diminishes, the bar is rotatably mounted on the plates and urged clockwise about its axis by a torsion spring (not shown) which thus holds the spring plates in engagement with the periphery of the roll.

With this arrangement, the web 11 is held taut at all times with the guide sheet 75 covering the top surface of the web and protecting the same against contamination by dirty liquid in the tank 10 prior to movement of the web over the screen 38. The underside of each guide sheet is made smooth and corrosion-resistant to minimize the resistance to sliding of the web along the sheet.

In order to control the separation of the filter web from the screen 38 and the side sealing surfaces 34 of the box 13 during the blow-down and indexing cycles, a pair of elongated supporting bars 82 are disposed beneath the box and normally immediately below and closely adjacent the side sealing surfaces of the box. The tops of these bars hold the side edge portions of the web closely adjacent the underside of the box (see FIG. 6), and a series of intermediate supporting bars 83 spaced apart laterally of the web between the side bars 82 limit separation of the intermediate portion of the web from the screen. Thus, the intermediate bars prevent the side edges from being drawn inwardly past the side bars and the surfaces 34 due to sagging of the web away from the screen. With a filter web of the usual thickness on the order of .008 of an inch, the tops of the side bars preferably are spaced approximately .015 of an inch below the seal surfaces 34 so that the separation of the web during blow-back and indexing is limited to a few thousandths of an inch. As illustrated in FIG. 6, the normal spacing of the tops of the intermediate bars from the screen may be somewhat greater.

Herein, both sets of bars 82 and 83 extend longitudinally of the web 11 to present little resistance to sliding of the web along the bars, and are secured together in the form of a unitary grid 84 (see FIG. 3) by two rods 85 (see FIGS. 5 and 6) telescoped through two sets of alined holes 87 and 88 through the bars adjacent the opposite ends thereof. Sleeves 89 telescoped onto the rods between the bars form spacers for holding the bars apart, and nuts 90 threaded onto the ends of the rods clamp the bars in the desired relationship.

To facilitate the initial positioning of the free end portion of a new roll 64 of filter web under the filter box 13, the grid 84 is mounted for selective movement relative to the box from the raised position (FIGS. 1 and 5) close to the screen 38 and the underside of the box to a lowered position (FIG. 2) spaced substantially greater distance below the box. For this purpose, the grid is suspended from the box by a parallelogram linkage herein compressing four links 91 each pivoted adjacent its upper end on a pin projecting horizontally outwardly from the side of the box, and adjacent its lower end on a parallel pin projecting outwardly from the side bar 82 on the same side of the grid. As shown herein, the upper pivots are formed by the free end portions of the rods 57 and 57a supporting the filter box, and the lower pivots are formed by the free end portions of the rods 85 connecting the grid bars 83 and 84. Thus, the links are swingable back and forth in vertical planes about the axes defined by the upper pivots to swing the grid alternately upwardly and downwardly relative to the box.

Fast on one of the links 91, the one shown on the left in FIG. 1, is an operating lever 92 (FIGS. 1, 4 and 5) for selectively positioning the grid 84. In this instance, the lower end of the lever is fastened to a sleeve 93 integral with the link and journaled for rotation about a horizontal axis 94 in a hole in the side plate 53, and the upper end portion of the lever upwardly and to the left at approximately a right angle with the lower end portion. With this arrangement, rocking of the lever through a short arc clockwise from the position shown in FIG. 1 rocks the links 91 through a corresponding arc toward vertical positions and thus lowers the grid 84 away from the filter box 13. To determine the raised position of the grid, a stop 96 is provided to engage the lever when the grid is in the desired position with the side bars 82 closely adjacent the side sealing surfaces 34. Herein, this stop is the end of a screw 97 (see FIG. 4) threaded through a bar 93 of a right-angle bracket 99 mounted on the side plate 53 to engage the left side of the lever when the grid is raised. A spring-loaded latch 92a holds the lever releasably against the stop. Thus, by adjusting the amount of projection of the screw, the normal position of the lever and the raised position of the grid may be varied. To release the lever and the grid, the lever simply is pushed to the right (FIG. 1) with sufficient force to swing the latch out of the way and release the lever to lower the grid.

A novel feeding device is provided for leading the free end of a new roll of filter paper downwardly into the tank 10 at one end of the filter box 13, under the box between the screen 38 and the lowered grid 84, and out of the liquid at the opposite end of the box to the take-up rolls 68 and 69. This device comprises a clamp 100 (FIGS. 8 and 9) attachable to the free end of the paper on the supply roll 64, and mounted on a clamp carrier 101 following the path of the web along the guide sheets 75 and 78 and the screen to move the clamp and the free end of the paper along the path. Herein, the carrier comprises two endless chains 102 (see FIG. 7) trained around sprocket wheels 103 and 104 on shafts 105 and 107 journaled in two sets of alined bearing sleeves 108 (FIG. 5) on the side plates 53 above the respective guide sheets as shown in FIGS. 1 and 7. The upper runs of these chains extend downwardly along the guide sheets 75 at the left end of the filter box and beneath the box along opposite sides of the grid outside the side bars 82 (see FIG. 5). At the other end of the box, the upper runs follow the guide sheet 78 out of the liquid and extend upwardly to the sprockets 103. The lower runs extend along the underside of the grid and are guided under the projecting end portions of shafts 110 journaled on the side bars at the opposite ends of the grid.

The clamp 100 is formed by two elongated bars 111 and 112 (FIG. 8) spanning the chains 102, one being of channel-shaped cross-section and fastened at its opposite ends to both chains. The other bar is fitted into the channel and pivoted on a pin 113 at one end on the first bar for swinging of its free end portion upwardly out of the channel and away from the first bar to open the clamp for insertion of the paper between the bars. With the clamp in the position shown in FIG. 7, the free end of the paper is placed between the bars and the free end of the pivoted bar is swung back into the channel and releasably secured therein by means of a ring clip 114 slidable along the bar 112 over the free end portion of the bar 111. Then, by means of a hand crank 115 for turning the sprockets 104, the clamp is moved under the filter box 13 and upwardly to a position adjacent the take-up rolls 68, 69, and is opened to release the paper. Preferably, an identical clamp 117 is mounted on the carrier 101 in the position shown in FIG. 7 to eliminate the need for returning the clamp to the left end of the tank prior to each feeding operation.

*Control circuit and operation*

To prepare the filter for operation, the grid 84 first is lowered by freeing the lever 92 and swinging it to the right thereby rocking each of the links 91 counterclockwise into generally vertical positions and swinging the grid downwardly to the left into its lowered position. Then, the free end of the filter paper on the supply roll 64 is clamped between the two bars 111 and 112 of the clamp 100 beneath the supply roll, and the hand crank 115 is turned to advance the clamp and the end of the paper downwardly along the guide sheet 75, along the screen 38 and then upwardly out of the liquid at the right-hand end of the filter box 13 where the clamp is opened and the paper end is inserted between the take-up rolls 68 and 69. Then the grid is raised back to the operating position closely adjacent the underside of the box by opening the latch 92ᵃ and swinging the lever back to the position in FIG. 1 against the adjustable stop 96. This raises the tops of the side bars 82 to within .015 of an inch of the side sealing surfaces 34.

With the fresh length of filter paper disposed across the underside of the box and held closely adjacent the screen 38 by the grid bars 82 and 83 and the control circuit in the deenergized condition shown in FIG 10, filtering is initiated by closing a start swtch 118 in a line L3 to complete a circuit across the power lines L1 and L2 through a normally closed stop switch 119 and a relay CRM which closes its switch CRM1 to connect a line L4 to the power line L1 and also complete a holding circuit around the start switch. Upon closure of switch CRM1, a circuit is completed across lines L4 and L2 through a line L5 and a normally closed switch CR12 to a timer TD4, and through a branch line L6 and a normally closed switch MR2 to a relay MF which, when energized, closes its switches MF1 to start the pump motor 61 and the pump 44 to begin evacuation of the chamber 14. Upon initiation of evacuation, the side edge portions of the web are drawn quickly and tightly against the side sealing surfaces 34 of the box 13 and the intermediate portion of the web is drawn tightly against the screen 38.

After a short preselected interval such as 0.5 of a second, the timer TD times out and closes its switch TD41 to energize a second timer TD2 through normally closed switches TD13 and TD62, and timer TD2 begins timing the filtering cycle during which liquid is drained through the web 11 and pumped out of the vacuum chamber 14 for recirculation through the system. Thus, a filter cake 15 begins to build up on the underside of the web and the vacuum in the chamber gradually increases due to clogging of the web by the cake.

The timer TD2 is set for a suitable time interval such as one to four minutes and, when the paper is fresh, ordinarily will time out before the vacuum in the chamber 14 attains the value selected for actuation of the vacuum switch VS, opening switch TD22 in a line L7 in the circuits of timers TD3 and TD6 to disable these timers. As filtering continues, the cake 15 and the vacuum in the chamber continue to build up until the vacuum switch is closed thereby indicating the need for a blow-back cycle.

Closure of the vacuum switch VS immediately energizes a relay CR1 through closed switches TD11 and TD31, and also energizes blow-back timers TD1 and TD7 through then closed switch TD32. Relay CR1 closes its switch CR11 for a holding circuit around the vacuum switch VS, and opens switch CR12 in the circuit of the forward control relay MF to stop the pump motor 61. When deenergized, relay MF closes its switch MF2 and completes a circuit to reverse control relay MR through switches TD71 and TD12, the latter having been closed instantly upon the energization of timer TD1. Relay MR closes switches MR1 to start the pump motor in reverse whereby clean liquid is pumped back into the vacuum chamber 14 and outwardly through the screen 38.

Initially, this reverse flow forces the filter web 11 downwardly away from the screen 38 and onto the bars 82 and 83 of the grid 84. Due to the spacing of the side bars only a few thousandths of an inch below the web, however, the side edge portions of the web are held closely adjacent the side seal surfaces 34 as shown in FIG. 5. The intermediate bars 83 similarly limit sagging of the intermediate portion of the web and thus insure that the side edges are not pulled inwardly past the side bars. Of course, the tension in the web holds the web tightly against the guide sheets 75 and 78.

With the web 11 in this condition, part of the filtrate flowing reversely through the screen 38 leaks outwardly through the narrow gap (see FIG. 6) above the edges of the paper in two thin films which continuously wash the seal areas of the paper and prevent dirty liquid from flowing over the paper into the vacuum chamber 14. Most of the reverse flow, however, is forced through the web to release the cake 15 for gravitation away from the web and removal by the conveyor 17. After a timed interval of reverse flow sufficient to insure that the cake has been released and at least has begun to settle away from the web, normal filtering is restored by timers TD1 and TD7 which were activated by closure of the vacuum switch VS and time out after an interval on the order of three to five seconds. TD7 then opens its switch TD71 to deenergize the reverse control relay MR and open switches MR1 to stop reverse pumping. After a short interval such as two seconds, timer TD1 opens its switch TD11 to deenergize relay CR1 which closes switch CR12 in the circuit of forward control relay MF. Thus, relay MF is energized through then closed switch MR2 and the vacuum pump is started to resume the evacuation of the vacuum chamber 14. The delay resulting from the difference in the settings of TD7 and TD1 permits particles to settle away from the web before filtering is resumed.

Thus, the blow-back cycle is terminated and liquid again is drawn through the screen 38 into the vacuum chamber. With the web 11 held closely adjacent the screen and the side sealing surfaces 34 on the box, the initial flow through the screen quickly draws the side portions of the web back into sealing engagement with the surfaces 34 and the intermediate portion of the web against and into the screen. Closure of switch CR12 as an incident to termination of the blow-down cycle energizes timer TD4 which closes its switch TD41 to activate the cycle timer TD2 after a short delay sufficient to insure that TD2 has been reset by opening of switch CR13.

As filtering continues in this manner through successive cycles, the lengths of the cycles become progressively shorter due to the trapping of solid particles in the pores of the web 11. Eventually, the web pores become so thoroughly clogged and the filtering rate is so impaired that the vacuum switch VS closes before the timer TD2 times out, thus indicating that it is desirable to bring a fresh length of filter web into the active position under the screen. As before, closure of the vacuum switch energizes timers TD1 and TD7 and relay CR1 to initiate a blow-down cycle including reversal of the pump motor 61 to dissipate the vacuum in the chamber 14 and begin to pump filtrate reversely through the screen 38.

In this instance however, switch TD22 still is closed in the line L7 leading to timers TD6 and TD3. Thus, closure of the vacuum switch VS also activates timer TD6 which instantly opens its switch TD62 to disable the cycle timer TD2, and subsequently closes its timed switch TD61 after a short interval of reverse pump operation such as one second, this interval being long enough to ensure that the filter web 11 has been forced downwardly out of the pores of the screen 38 and is spaced from the latter. Upon closure of switch TD61, the timer TD3 is energized to start a timed web-indexing cycle with the web spaced below the screen and filtrate flowing outwardly between the web margins and the side sealing surfaces 34 as well as reversely through the filtrate paper to release the cake thereon.

For this purpose, switch TD33 of the timer TD3 closes instantly in the circuit of a relay M2 whose normally open switches M21 then are closed to start the indexing motor 71 to turn the take-up rolls 68, 69 in a direction to draw fresh paper off the supply roll 64. Switch TD34 of the timer closes instantly to maintain the reverse energization of the pump motor 61 through a line L8 during the indexing cycle, and switch TD32 opens instantly to deenergize the timers TD1 and TD7. Timer TD3 is set to open its timed switch TD31 and its instant switches TD33 and TD34 when the screen 38 is covered with a fresh length of filter paper, for example, after seven seconds of operation of the indexing motor. When this occurs, the indexing motor is stopped, the reverse control relay MR is deenergized to stop reverse pumping, relay CR1 is deenergized, and switch CR12 is closed thereby energizing timer TD4 and forward control relay MF. Thus, the pump 44 again begins to evacuate the chamber 14, pulling the fresh length of filter web tightly against the screen 38 and the sealing surfaces 34, and switch TD41 is closed to activate the cycle timer TD2 and begin a new filtering cycle.

*Alternate form*

An alternate form of the invention is shown in FIG. 11 in which the relatively expensive reversible pump 44 of the preferred form is replaced by a much cheaper centrifugal pump 121 mounted on top of the filter box 13 and operable when driven by a motor 122 to draw liquid from the vacuum chamber in the filter box into a discharge pipe 123 leading to a storage tank 124 supported well above the level of the filter box. With this arrangement the filtering action is the same as the action of the filter shown in FIGS. 1 through 10. Backwashing of the web, however, is initiated simply by deenergizing the centrifugal pump and thereby permitting a free downward flow from the storage tank to the vacuum chamber through the connecting means formed by the pipe and the centrifugal pump.

Herein, the storage tank 124 is supported on top of the filter 10 on an angle bar frame 125 supported on the sidewalls of the filter tank. It will be evident, however, that the magnitude of the pressure head available may be increased by mounting the storage tank even higher, for example, adjacent the ceiling of the room or on a higher floor of the building. A return pipe 127 having an open upper end 128 adjacent the top of the storage tank and a open lower end 129 opening into the filter tank prevents the filtrate in the storage tank from overflowing. A selectively operable valve 130 is provided in the pipe 123 for closing the latter and holding a supply of filtrate in the storage tank when the filter is shut down.

In all other important respects, the alternate form differs from the preferred form only in functionally unimportant details, and similar parts are indicated by corresponding primed reference numbers. The control circuit may be basically the same with the exception of the reversing control which is no longer needed for the pump motor.

I claim as my invention:

1. In a vacuum filter, the combination of, a tank adapted to be filled to an approximate level with liquid to be filtered, a box having imperforate top and sidewalls defining a vacuum chamber having an open rectangular lower end surrounded by downwardly facing side and end sealing surfaces and disposed below said liquid level, a relatively rigid plate fitted into and covering said open end and having perforations therethrough, a screen substantially flush with said surfaces covering the underside of said plate and having pores communicating with said chamber through said perforations, said box, said plate and said screen being stationarily mounted in said tank, an imperforate guide sheet secured at its lower end to one end of said box with its lower end portion flush with the sealing surface at said one end and with the upper end portion of said sheet curving arcuately upwardly and projecting above said liquid level, means for rotatably supporting a supply roll of filter web wider than said open end on said tank above said guide sheet with the free end portion of said web extending downwardly along the sheet into said liquid, under said box and said sealing surfaces, and upwardly out of the liquid at the other end of the box, selectively operable mechanism above said other end for indexing said web endwise and pulling a fresh length thereof off said supply roll and under said box, means yieldably resisting rotation of said roll thereby to maintain said web taut and tightly against said sheet and said surfaces, a pump for withdrawing liquid from said chamber and creating a vacuum therein first to draw said web tightly and upwardly against said sealing surfaces and said screen and then induce the straining of liquid through said web, means for periodically forcing a reverse flow of filtered liquid through said screen to force said web downwardly away from the screen and said side sealing surfaces, means operable to activate said indexing mechanism after an interval of reverse liquid flow sufficient to insure that said web is spaced from said screen, and means for maintaining said reverse flow during indexing of said web.

2. In a vacuum filter, the combination of, a tank adapted to be filled to an approximate level with liquid to be filtered, a box supported in said tank and having a bottom opening disposed below said level, a relatively rigid plate covering said opening and having perforations therethrough, a screen covering said opening and secured to said box, means for guiding an elongated flexible filter web downwardly, into said liquid at one end of said box, across the underside of said screen to cover the latter, and upwardly out of the liquid at the other end of said box, means on said box providing downwardly facing sealing surfaces extending around the entire periphery of said screen substantially flush therewith and including first sealing surfaces extending longitudinally of said web above the opposite side edge portions thereof and second sealing surfaces extending transversely of the web adjacent the ends of said box, means for withdrawing liquid from the interior of said box and creating a vacuum therein first to draw said web upwardly and tightly against said sealing surfaces and said screen with portions of the web drawn into the pores of the screen and then induce the straining of liquid through the web, means for periodically forcing a reverse flow of filtered liquid through said screen to force said web downwardly away from the screen, a grid disposed below said box and including two side bars spaced below the side edge portions of said web and closely adjacent said first sealing surfaces to limit separation of said side edge portions from said first surfaces during said reverse flow, and intermediate bars extending longitudinally of said web below the latter and between said side bars to limit separation of said intermediate portion from said screen, mechanism for indexing said web endwise under said box while liquid flows reversely through said screen and outwardly between said side edge portions and said first sealing surfaces, and means for restoring normal filtering upon completion of the indexing of said web.

3. A vacuum filter as defined by claim 2 including a clamp adapted to be secured to one end of said web, and means supporting said clamp for movement downwardly into said liquid at said one box end, under said box between said screen and said grid, and upwardly out of said liquid at the other end of the box.

4. A vacuum filter as defined by claim 3 further including selectively operable mechanism for moving said grid downwardly away from said box to permit said clamp to pass between said bars and said screen.

5. A vacuum filter as defined by claim 3 in which said clamp supporting means comprise two endless chains disposed on opposite sides of said box with one run of each chain guided along a path generally following the path of said web, said clamp extending transversely of said web and secured at its ends to said chains.

6. A vacuum filter as defined by claim 4 in which said grid moving mechanism comprises a plurality of parallel links pivoted on said box and on said grid for swinging back and forth in vertical planes, a lever for rocking one of said links back and forth to swing the lower end thereof and said grid alternately upwardly and downwardly, and means for holding said lever releasably in a preselected position with said side bars closely adjacent said first sealing surfaces.

7. A vacuum filter as defined by claim 6 further including means for adjusting said preselected position thereby to adjust the spacing of said side bars from said first sealing surfaces.

8. In a vacuum filter, the combination of, a tank adapted to be filled to an approximate level with liquid to be filtered, a box supported in said tank and having imperforate top and side walls and a bottom opening disposed below said level, a screen covering said opening and secured to said box having pores communicating with the opening, means for guiding an elongated flexible filter web downwardly into said liquid, across the underside of said screen to cover the latter, and upwardly out of the liquid, said box having downwardly facing sealing surfaces extending around the entire periphery of said screen substantially flush therewith and including first surfaces extending longitudinally of said web above the opposite side edge portions thereof and second surfaces extending transversely of the web at the opposite ends of said screen, a pump for withdrawing liquid from the interior of said box and creating a vacuum therein first to draw said web upwardly and tightly against said sealing surfaces and said screen with portions of the web drawn into said pores and then to induce the straining of liquid through the web, means for periodically forcing a reverse flow of filtered liquid through said screen to force said web downwardly away from the screen, elongated support elements spaced below and closely adjacent said first sealing surfaces to engage the underside of said web during said reverse flow and limit the separation of the edge portions of said web from said first surfaces, and mechanism for advancing said web endwise under said box while liquid is flowing reversely through said screen and outwardly between said web and said first sealing surfaces.

9. A vacuum filter as defined by claim 8 further including additional support elements extending longitudinally of said web between said first mentioned support elements and spaced apart laterally of the web to limit separation of the intermediate portion of the web from said screen during said reverse flow.

10. In a vacuum filter, the combination of, a tank adapted to be filled to an approximate level with liquid to be filtered, a box supported in said tank and having a bottom opening disposed below said level, a screen covering said opening and secured to said box and having pores communicating with the opening, said box having a downwardly facing sealing surface substantially flush with the underside of said screen and extending around the entire periphery thereof, means for guiding an elongated flexible filter web downwardly into said liquid, across the underside of said screen to cover the latter and upwardly out of the liquid, a pump for withdrawing liquid from the interior of said closure to create a vacuum therein and induce the straining of liquid through said web after the latter is drawn upwardly and tightly against said sealing surface and said screen with portions of the web drawn into the pores of the screen, and means for periodically interrupting the withdrawal of liquid from said closure, forcing a reverse flow of liquid through said screen to force said web away from the screen, and then advancing the web endwise along the screen while maintaining said reverse flow thereby to renew the covering of the screen.

11. A vacuum filter as defined by claim 10 in which said guiding means includes a first imperforate guide sheet having a lower end flush with one of said second sealing surfaces and curving upwardly therefrom and out of said liquid to guide said web into the liquid and onto said screen at one end of said box while covering the top surface of the web to prevent contact thereof with the liquid in the tank.

12. A vacuum filter as defined by claim 11 in which said guiding means also includes a similar second imperforate guide sheet curving upwardly from the other end of said box to guide said web out of the liquid.

13. A vacuum filter as defined by claim 12 further including means for mounting a supply roll of filter web above the liquid at said one end of said box and yieldably resisting rotation of said roll, said web advancing mechanism being positioned to draw the web upwardly along said second sheet out of the liquid whereby the resistance to rotation of said supply roll maintains said web taut and in tight face-to-face sealing engagement with said sheets.

14. In a vacuum filter, the combination of, a tank adapted to be filled to an approximate level with liquid to be filtered, a closure supported in said tank and having a perforated bottom wall disposed below said level, a screen lying against said bottom wall and covering the perforations therein and having pores communicating with said perforations, means providing a downwardly facing sealing surface extending around the entire periphery of said screen, means for guiding an elongated flexible filter web across the underside of said screen to cover the latter, a pump for withdrawing liquid from the interior of said closure to create a vacuum therein and induce the straining of liquid through said web after the latter is drawn upwardly and tightly against said sealing surface and said screen with portions of the web drawn into the pores of the screen, means for periodically forcing a reverse flow of liquid through said screen to force said web away from the screen, and mechanism for indexing the web endwise along the screen in spaced relation therewith to renew the covering of the screen.

15. In a vacuum filter, the combination of, a tank adapted to be filled to an approximate level with liquid to be filtered, a closure supported in said tank and having a bottom opening disposed below said level, a screen covering said bottom opening therein and having pores communicating therewith, means providing a downwardly facing sealing surface extending around the entire periphery of said screen, means for guiding an elongated flexible filter web across the underside of said screen to cover the latter, a pump for withdrawing liquid from the interior of said closure to create a vacuum therein and induce the straining of liquid through said web after the latter is drawn upwardly and tightly against said sealing surface and said screen with portions of the web drawn into the pores of the screen, means for periodically forcing a reverse flow of liquid through said screen to force said web away from the screen, and mechanism for indexing the web endwise along the screen in spaced relation therewith to renew the covering of the screen.

16. A vacuum filter as defined by claim 15 further including means operable to activate said indexing mechanism after an interval of reverse liquid flow sufficient to insure that said web is spaced from said screen.

17. A liquid filter having, in combination, a first tank adapted to contain a body of dirty liquid to be filtered, a closure defining a vacuum chamber and having a bottom opening covered by a filter medium submerged in said liquid, a filtered liquid storage tank disposed substantially above said first tank, means connecting said chamber and said storage tank including a power-driven pump for withdrawing liquid from said chamber and delivering the same to said storage tank whereby to induce upward filtering of said dirty liquid through said filter medium, said connecting means when said pump is idle providing for the free downward flow of liquid from said storage tank to said chamber to create a pressure therein of sufficient magnitude to release the filtered out solids from said medium for downward settling through said dirty liquid.

18. A filter as defined in claim 17 in which said pump is of the centrifugal type and permits a free reverse flow of filtered liquid through said connecting means to said chamber when the pump is inactive.

References Cited by the Examiner

UNITED STATES PATENTS

| | | | |
|---|---|---|---|
| 3,091,336 | 5/1963 | Hirs | 210—387 X |
| 3,206,030 | 9/1965 | Estabrook | 210—387 X |
| 3,221,885 | 12/1965 | Hirs | 210—387 X |

REUBEN FRIEDMAN, *Primary Examiner.*

D. M. RIESS, *Assistant Examiner.*